United States Patent [19]

Bowman et al.

[11] 4,193,283
[45] Mar. 18, 1980

[54] METHOD OF SLITTING A DOUBLE OR TRIPLE STRANDED BAR

[75] Inventors: Raymond E. Bowman, Oshawa, Canada; Anthony Greaves, Belting, England

[73] Assignee: Co-Steel International Limited, Whitby, Canada

[21] Appl. No.: 935,499

[22] Filed: Aug. 21, 1978

Related U.S. Application Data

[63] Continuation-in-part of Ser. No. 764,699, Feb. 1, 1977, abandoned, which is a continuation-in-part of Ser. No. 656,178, Feb. 9, 1976, abandoned.

[51] Int. Cl.² .............................................. B71B 1/00
[52] U.S. Cl. ...................................... 72/204; 72/366; 72/221
[58] Field of Search ................ 72/203, 204, 221, 366; 29/234, 413, DIG. 33, 100; 225/101, 106, 2; 164/76, 283

[56] References Cited

U.S. PATENT DOCUMENTS

| 885,508 | 4/1908 | McKee | 72/366 X |
| 1,910,271 | 5/1934 | Williams | 72/204 |
| 1,977,285 | 10/1934 | McCleery | 72/235 X |
| 3,483,915 | 12/1969 | Schneckenburger et al. | 164/76 |

Primary Examiner—Milton S. Mehr
Attorney, Agent, or Firm—Shlesinger, Arkwright, Garvey & Dinsmore

[57] ABSTRACT

In the high speed production of elongated metal bars, a method of slitting a double or triple stranded bar interconnected at a continuous node or nodes, in which the bar is rolled to reduce the cross-section of each strand equally, the compressive working force being applied to create lateral tensile forces whereby the strands diverge and separate. In a triple stranded bar the two outer strands are worked in the same manner to separate them from the central strand.

3 Claims, 2 Drawing Figures

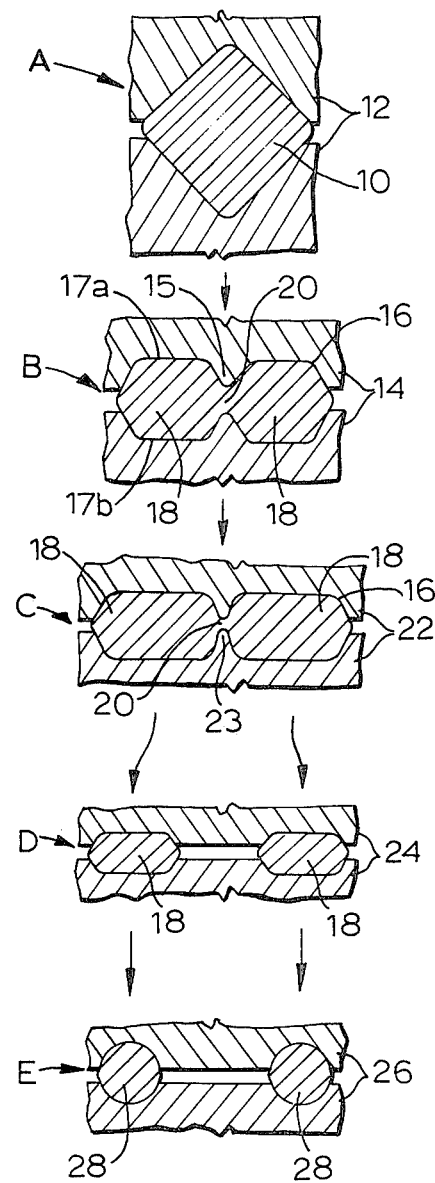
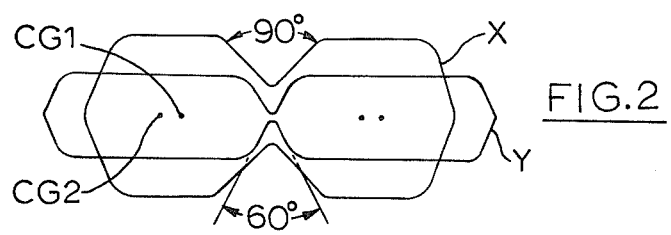
FIG.1
FIG.2

METHOD OF SLITTING A DOUBLE OR TRIPLE STRANDED BAR

This application is a continuation-in-part of U.S. patent application Ser. No. 764,699 filed Feb. 1, 1977, and now abandoned, which in turn was a continuation-in-part of application Ser. No. 656,178 filed Feb. 9, 1976, now abandoned.

FIELD OF THE INVENTION

This invention relates to a method of slitting billets of metal which are rolled to produce a double or a triple stranded bar.

BACKGROUND OF THE INVENTION

In the high speed production of steel bars or other elongated metal bars a heated billet is passed through a series of reducing rolls. In this process only a certain production can be achieved at any predetermined delivery speed. To increase production for a given speed of delivery a technique has been developed of rolling a billet to form two or more strands interconnected by a continuous node or nodes and then slitting the bar by passing the node or nodes longitudinally over the edge of fixed knives. Such knives are, however, subject to wear and must be replaced frequently, causing expense and loss in production time. This wear can be minimized by using rotating knives or knife-like rolls which do not substantially change the shape or cross-sectional area of the bars. However, such wear cannot be eliminated.

It has been known to separate interconnected strands by passing them between a pair of opposing rolls which cause adjacent strands to be offset vertically relative to one another, thereby shearing the node or web and separating the strands. This method may result in a product of inferior quality.

It has also been known to separate interconnected strands by passing them between a pair of rolls which reduce the cross-sectional area of adjacent strands by different amounts thus causing them to exit from the roll stand at different velocities, the speed differential in turn inducing a longitudinal force in the node which results in ruptures and strand separation. This method is not well suited to modern continuous rolling mills because the separated strands are not presented to subsequent stands in the desired form, namely simultaneously and at substantially identical velocities. Furthermore, this method can only be used in a mill which is equipped with twin looping tables.

It is an object of the present invention to provide an improved method of longitudinally slitting a double or triple stranded bar which does not require the continuous operation of slitting knives.

It is a further object of the present invention to provide an improved method of longitudinally slitting a double or triple stranded bar without vertical shearing.

It is a further object of the present invention to provide an improved method of longitudinally slitting a double or triple stranded bar which will produce a finished bar of high quality.

It is still another object of the invention to provide an improved method of longitudinally slitting a double or triple stranded bar, which method may be used in a modern high speed continuous rolling mill including such a mill which may be normally equipped for single strand operation having single looping tables in the finishing train.

SUMMARY OF THE INVENTION

Essentially the invention resides in the production of elongated metal bars from billets in which the billet is passed between the opposed rolls of successive mill stands which apply compressive working forces to the billet, and consists of a method of slitting a multi-stranded bar of no more than three strands wherein each strand is interconnected to the adjacent strand at a continuous node, comprising the step of passing the bar through the opposed rolls of at least one mill stand to reduce the cross-sectional area of each strand by equal percentages, applying to said bar in said at least one mill stand a compressive working force so as to produce said equal cross-sectional area reduction on each of said strands and simultaneously create lateral tensile forces in each connecting node causing each of said nodes to rupture and causing a laterally outward shift of the center of gravity of the outermost of said strands substantially simultaneously with the creation of said lateral tensile forces, thereby separating adjacent strands.

BRIEF DESCRIPTION OF THE DRAWINGS

An example embodiment of the invention is shown in the accompanying drawings in which:

FIG. 1 is a flow diagram showing an example sequence of strands which are sets of rolls having grooves or "passes" of different cross-sectional shapes for reducing a billet to a double stranded bar, separating or slitting the strands longitudinally, and shaping the separated strands.

FIG. 2 is a schematic diagram showing the cross-sectional shape of the double stranded bar as it enters the third stand of FIG. 1 superimposed on the same bar as it reaches the centre line of the rolls of the third stand.

DETAILED DESCRIPTION

As seen in FIG. 1 of the drawings, a billet of metal is passed through a series of mill stands each having a set of opposed rolls which first reduce the billet to a double stranded bar and then slit the double stranded bar into two separate strands. The opposed rolls of further stands reduce the two separated stands to bars of desired cross-sectional dimensions. In the example illustrated by FIG. 1 a billet passing between a first pair of opposed rolls 12 of a first stand A is reduced in cross-sectional area and a bar 10 having a substantially square cross-sectional shape is produced. After leaving stand A, bar 10 passes into a second stand B between a second pair of opposed rolls 14 each having a centrally disposed collar 15 whereby bar 10 is further reduced and reshaped into a double stranded bar 16 having a pair of parallel strands 18 equal in area and interconnected at a node 20. From rolls 14 of stand B, double stranded bar 16 is passed into a third stand C between a third pair of opposed rolls 22 each having a centrally disposed collar 23, which further reduces the cross-sectional area of the bar, reducing the cross-sectional area of the strands by equal percentages.

The pass between rolls 22 is both shallower and wider than strands 16 entering stand C from stand B, and the strands are flattened and widened to produce strands 18. The centres of gravity of the two strands are shifted away from one another. In FIG. 2, outline X represents the cross-sectional shape of the double stranded bar as it enters stand C of FIG. 1 after passing from stand B, and outline Y represents the cross-sectional shape of the same bar as it reaches the centre line of the rolls of stand C. By such working the centre of gravity of each strand 18 in cross-section X, represented by numeral CG1, is shifted to location CG2 in cross-section Y. In so doing, the material of strand 18 closest to node 20 is elongated more than is the material adjacent the outer edges of the strands. This greater elongation closer to node 20 causes strands 18 to tend to diverge, creating lateral tensile forces in the node. These forces in the node cause rupture and thus separation of the strands.

After leaving rolls 22, strands 18 in the example embodiment pass separately through a stand D having a pair of opposed reducing rolls 24 and further through a stand E having a pair of opposed reducing rolls 26 to produce finished bars 28.

It will be appreciated that stands A to E are not the only stands in the mill; for example roughing stands may precede stand A. It will also be appreciated that the cross-sectional shape of the final product may be of any desired cross-sectional bar shape.

To produce separate strands from a three stranded bar the same procedure is followed as in the previously described example embodiment except that the elongation of the middle strand of the bar is uniform across it while there is an elongation gradient in the two outer strands. This causes the two outer strands to diverge from the middle strand and separate at their interconnecting nodes.

It has been found preferable to provide collars 15 of rolls 14 and collars 23 of rolls 22 of a wedge-shaped configuration. Each collar 15 preferably forms an included angle greater than the included angle of each collar 23. In a specific example each collar 15 forms an included angle of approximately ninety degrees (90°) at its apex and the apex is rounded with a radius of about one-eighth of an inch (1/8") the thickness of the gap between these two collars and the resulting thickness of the node 20 being about one half the thickness of the strands 18 as the bar leaves stand B, while each collar 23 preferably forms an included angle of approximately sixty degrees (60°) at its apex and the apex is rounded with a radius of about one thirty-second of an inch (1/32"), the width of the gap between these two collars being about twenty thousandths of an inch (0.02"). It will be appreciated that it is node 20 which in this example is approximately 0.02" in thickness, which must be torn to separate strands 18. In other examples these dimensions and angles will vary with the size and shape of the strands being separated.

Of course the speed of travel of the bar, the chemistry of the bar and the temperature of the bar, in addition to the above-mentioned pass configuration, may affect the separation of the strands. In particular it will be appreciated that an unduly slow speed of travel may inhibit the operation of the invention. However, "speed" will be understood as a relative term which will differ with the bar size and pass configuration.

In most cases it will be preferable for all strands to have the same cross-sectional area and shape. However, this is not essential to the invention provided that the percent reduction in stand C, the slitting stand, is substantially equal for all strands. In slitting a triple stranded bar the production of different shapes or sizes or strands from one billet is facilitated if the two outer strands are identical and only the centre strand is different.

This invention applies to the separation of a multi-stranded bar of not more than three strands. It will, however, be appreciated that the invention can be applied more than once in a single mill train. For example, passes in rolls 24 may have a shape similar to that of the pass in roll 14, those in rolls 26 similar to that in rolls 22. Subsequent rolls in this example would have four passes each. By applying this cascade principle the invention can also be used to produce six or nine bars from a single billet.

We claim:

1. In the production of elongated metal bars from billets in which the billet is passed between the opposed rolls of successive mill stands whereby a compressive working force is applied to the billet, a method of slitting a multi-stranded bar of no more than three strands wherein each strand is interconnected to the adjacent strand at a continuous node of less thickness than said strands, comprising the step of passing the bar through the opposed rolls of at least one mill stand, applying to said bar in said at least one mill stand a compressive working force so as to produce an equal cross-sectional area reduction in each of said strands and to create lateral tensile forces in each connecting node causing each of said nodes to rupture and causing a laterally outward shift of the centres of gravity of the outermost of said strands substantially simultaneously with the creation of said lateral tensile forces, thereby separating adjacent strands.

2. A method as claimed in claim 1 in which the bar is passed through at least two mill stands, the passage through the first stand forming a double stranded bar from a billet with a first included angle between the strands of the node thereof, the passage through the second mill stand reducing the cross-sectional area of each strand with a second included angle between the strands at the node thereof, said first included angle being greater than said second included angle.

3. A method as claimed in claim 1 in which each of said separated strands is worked as a further billet to produce a further multi-stranded bar of no more than three strands, each strand of said further bar being worked thereby producing, in cascade arrangement, at least two further separated strands.

* * * * *